(12) United States Patent
Kazama et al.

(10) Patent No.: US 7,643,980 B2
(45) Date of Patent: Jan. 5, 2010

(54) ELECTROMAGNETIC FIELD ANALYSIS APPARATUS, METHOD AND COMPUTER PROGRAM

(75) Inventors: Kikuo Kazama, Kawasaki (JP); Hideji Miyanishi, Yokohama (JP); Kazumasa Aoki, Tokyo (JP); Toshinobu Shoji, Zama (JP); Kenji Motohashi, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 517 days.

(21) Appl. No.: 11/342,750

(22) Filed: Jan. 31, 2006

(65) Prior Publication Data

US 2006/0173662 A1    Aug. 3, 2006

(30) Foreign Application Priority Data

Jan. 31, 2005    (JP)    ............................. 2005-022865

(51) Int. Cl.
*G06F 17/50*    (2006.01)
(52) U.S. Cl. ............................. 703/14; 703/13; 703/2; 716/1; 716/4; 716/5
(58) Field of Classification Search ............ 703/2, 703/13, 14; 716/1, 4, 5
See application file for complete search history.

(56) References Cited

U.S. PATENT DOCUMENTS

| 5,625,578 | A  | * | 4/1997  | Du Cloux et al. | ............... | 703/2 |
| 7,149,666 | B2 | * | 12/2006 | Tsang et al. | .................... | 703/2 |
| 7,197,446 | B2 | * | 3/2007  | Breiland et al. | ............... | 703/14 |

FOREIGN PATENT DOCUMENTS

| JP | 05-026928   | 2/1993  |
| JP | 11-295365   | 10/1999 |
| JP | 2001-357093 | 12/2001 |
| JP | 2002-259489 | 9/2002  |
| JP | 2003-006181 | 1/2003  |
| JP | 2003-271695 | 9/2003  |
| JP | 2004-054642 | 2/2004  |
| JP | 2004-239784 | 8/2004  |
| JP | 2004-362074 | 12/2004 |

OTHER PUBLICATIONS

Jin Zhao and Jiayuan Fang, "Significance of Electromagnetic Coupling Through Vias in Electronics Packaging", 1997, IEEE, pp. 135-138.*
Qizheng Gu, Y. Eric Yang, M. Ali Tassoudji; "Modeling and Analysis of Vias in Multilayered Integrated Circuit", 1993, IEEE, pp. 206-214.*
Timo Tarvainen, "Simplified Modeling of Parallel Plate Resonances on Multilayer Printed Circuit Boards", 2000, IEEE, pp. 284-289.*

* cited by examiner

*Primary Examiner*—Jason Proctor
(74) *Attorney, Agent, or Firm*—Oblon, Spivak, McClelland, Maier & Neustadt, L.L.P.

(57) ABSTRACT

An electromagnetic field analysis apparatus includes an information input device configured to input information as to wirings and components of an analysis object and a modeling device configured to generate a simulation model of the analysis object based on the inputted information as to wirings and components of the analysis object. A model simplification device simplifies the simulation model into a simplified simulation model by dividing the analysis object according to the simulation model into a plurality of cells and thinning out, when a plurality of elements are included in a cell, the plurality of elements.

24 Claims, 9 Drawing Sheets

BEFORE PERFORMING THINNING OUT

AFTER PERFORMING THINNING OUT

ELECTROMAGNETIC FIELD ANALYSIS APPARATUS, METHOD AND COMPUTER PROGRAM

CROSS-REFERENCE TO RELATED APPLICATIONS

The present application claims priority and contains subject matter related to Japanese Patent Application No. 2005-022865 filed in the Japanese Patent Office on Jan. 31, 2005 and the entire contents of which are hereby incorporated herein by reference.

BACKGROUND OF THE INVENTION

1. Field of the Invention

The present invention relates to analysis of an electromagnetic field radiated from an electronic apparatus, and in particular relates to an electromagnetic field analysis apparatus, an electromagnetic field analysis method, and an electromagnetic field analysis computer program that are capable of decreasing the memory usage and the calculation time of a computer in simulating electromagnetic field distribution.

2. Discussion of the Background

As miniaturization and operational speeding up of electronic apparatuses progress, EMI (electromagnetic interference) noise radiated from the electronic apparatuses is increasing. Because EMI noise radiated from an electronic apparatus can cause an erroneous operation of a nearby electronic apparatus, generally a regulatory action is taken in various countries concerning radiation of EMI noise from electronic apparatuses. In the case where an EMI regulatory limitation is not respected, import and sale of the electronic apparatuses in the respective country may not be allowed. If an electronic apparatus planned for sale does not meet the EMI regulatory value or limitation, the import or sale of the apparatus can be stopped or postponed until the electronic apparatus meets the EMI regulatory value or limitation, thereby creating possible economic damage to the companies involved in the electronic apparatus.

Generally, in developing an electronic apparatus, after a prototype of the electronic apparatus has been completed, the EMI noise radiation level of the prototype is measured in an electromagnetic wave dark room for measuring EMI noise, and if the EMI noise radiation level exceeds a regulatory value, a countermeasure is taken to be incorporated in the prototype as a design change. The EMI noise radiation level of the prototype incorporating the countermeasure is measured again in the electromagnetic wave dark room, and if the EMI noise radiation level still exceeds the regulatory value, another countermeasure is taken. Thus, the measures against EMI noise are generally taken by a trial and error method.

Recently, as the processing speed of computers increases, it has become possible to simulate EMI noise radiation by computer calculation. However, simulating EMI noise radiation by computer calculation generally requires an enormous processing time of the computer, and even when a top-class commercial computer with a high speed CPU and a large memory is used, a relatively long time is required for the calculation. In a commercial simulator calculating 3-D electromagnetic field distribution, overflow is caused even by calculating a single 3-D electromagnetic field distribution of one printed circuit board normally mounted in an electronic apparatus. Therefore, the use of such simulators is usually limited to the case of calculating electromagnetic field distribution in the vicinity of a very small printed circuit boards.

To cope with the above-described problem, for example as described in Japanese Patent Laid-open publication No. 2004-54642, it has been proposed to enhance the calculation speed and the accuracy in simulating electromagnetic field distribution by dividing a simulation target object and performing parallel processing using a plurality of computers. However, as the miniaturization of printed circuit boards rapidly progresses, the width of a signal pattern is becoming smaller and the number of vias (holes performing connection between layers of a multi-layer printed circuit board) is increasing, so that even when a large number of computers are used for parallel processing, depending upon the size of a simulation target object, it may occur that the calculation cannot be performed due to overflowing. To avoid the overflowing, the number of computers must be increased, which is disadvantageous since it increases complexity and costs.

Japanese Patent Laid-open publication No. 2001-357093 describes a circuit simulation method, in which when analyzing transient responses of an electronic circuit, to enhance the analysis accuracy without increasing the analysis processing time, the analysis calculation is performed based on an analysis level, which is selected for each circuit block of the electronic circuit according to the accuracy required for the circuit block. The analysis level is changed for each circuit block by setting an arbitrary analysis time, so that detail analysis can be performed only for a circuit block requiring the high analysis accuracy. Further, a model parameter can be changed so that analysis processing is rapidly performed when giving greater importance to the processing time. In this method, however, when the number of circuit blocks requiring the high analysis accuracy is large, the processing time increases significantly. Further, in modeling an object that has to be analyzed, if the information regarding the object to be analyzed is randomly omitted to decrease the volume of processing, the analysis accuracy will be deteriorated.

SUMMARY OF THE INVENTION

The present invention has been made in views of the above-discussed and other problems and addresses the above-discussed and other problems.

Preferred embodiments of the present invention provide a novel electromagnetic field analysis apparatus, a novel electromagnetic field analysis method, and a novel electromagnetic field analysis computer program, that can decrease the memory usage and the calculation time of a computer in simulating electromagnetic field distribution of an analysis by simplifying a simulation model of the object to be analyzed such that difference between a calculation result of electromagnetic field distribution of the object to be analyzed according to a simplified simulation model and a measurement result of actual electromagnetic field distribution of the object to be analyzed is minimal.

According to an embodiment of the present invention, an electromagnetic field analysis apparatus includes an information input device configured to input information as to wirings and components of an analysis object, being the object that the user wants to analyze the electromagnetic field distribution, and a modeling device configured to generate a simulation model of the analysis object based on the inputted information as to wirings and components of the analysis object. A model simplification device simplifies the simulation model into a simplified simulation model by dividing the analysis object according to the simulation model into a plurality of cells and thinning out, when a plurality of elements are included in a cell, the plurality of elements included in the cell such that difference between a calculation result of electromagnetic field distribution of the analysis object according to the simplified simulation model and a measurement result of actual electromagnetic field distribution of the analysis object is minimal. An electromagnetic field distribution calculation device calculates an updated electromagnetic field distribution of the analysis object according to the simplified simulation model, and an output device outputs a calculation result of the updated electromagnetic field distribution of the analysis object according to the simplified simulation model.

In the electromagnetic field analysis apparatus, the model simplification device may thin out the plurality of elements included in the cell such that difference between an electric current calculated according to the simplified simulation model and an actual electric current is minimal.

In the electromagnetic field analysis apparatus, the elements, which are thinned out by the simulation model simplification device, may be vias of the analysis object. In this case, the model simplification device sets pairs of a current input terminal and a current output terminal of each component of the analysis object according to the simulation model, sets an interval of meshes defining a size of each cell, sets an impedance calculation area for each pair of a current input terminal and a current output terminal, calculates impedances of all current paths passing through vias in each impedance calculation area, and thins out vias included in each cell in the impedance calculation area such that a via belonging to a current path having the lowest impedance among current paths passing through the vias in the cell remains. The model simplification device may alternatively calculate lengths of current paths passing through vias in each impedance calculation area, and thin out vias included in each cell in the impedance calculation area such that a via belonging to a shortest current path among current paths passing through the vias in the cell is remaining.

The electromagnetic field analysis apparatus may further include an information extraction device configured to extract selected information from the inputted information as to wirings and components of the analysis object. In this case, the modeling device generates the simulation model of the analysis object based on the extracted information. Further, the information extraction device may extract from the inputted information as to wirings and components of the analysis object information as to wirings relating to power sources and grounds of the analysis object and information as to components connected with the wirings relating to the power sources and the grounds.

In the above-described electromagnetic field analysis apparatuses, the information as to wirings and components of the analysis object inputted to the information input device may include attribute information of signal lines of the analysis object.

According to another embodiment of the present invention, an electromagnetic field analysis method is provided. The method includes inputting information as to wirings and components of an analysis object; generating a simulation model of the analysis object based on the inputted information as to wirings and components of the analysis object; simplifying the simulation model into a simplified simulation model by dividing the analysis object according to the simulation model into a plurality of cells and thinning out, when a plurality of elements are included in a cell, the plurality of elements included in the cell such that difference between a calculation result of electromagnetic field distribution of the analysis object according to the simplified simulation model and a measurement result of actual electromagnetic field distribution of the analysis object is minimal; calculating an updated electromagnetic field distribution of the analysis object according to the simplified simulation model; and outputting a calculation result of the updated electromagnetic field distribution of the analysis object according to the simplified simulation model.

In the electromagnetic field analysis method, in the simulation model simplifying, the plurality of elements included in the cell may be thinned out such that difference between an electric current calculated according to the simplified simulation model and an actual electric current is minimal.

In the electromagnetic field analysis method, the elements, which are thinned out, may be vias of the analysis object. In this case, in the simulation model simplifying, pairs of a current input terminal and a current output terminal of each component of the analysis object according to the simulation model are set, an interval of meshes defining a size of each cell is set, an impedance calculation area is set for each pair of a current input terminal and a current output terminal, impedances of all current paths passing through vias in each impedance calculation area are calculated, and vias included in each cell in the impedance calculation area are thinned out such that a via belonging to a current path having the lowest impedance among current paths passing through the vias in the cell is left. In the simulation model simplifying, alternatively, lengths of all current paths passing through vias in each impedance calculation area may be calculated, and vias included in each cell in the impedance calculation area may be thinned out such that a via belonging to a shortest current path among current paths passing through the vias in the cell is left.

The electromagnetic field analysis method may further include extracting selected information from the inputted information as to wirings and components of the analysis object. In this case, in the generating of the simulation model, the simulation model of the analysis object may be generated based on the extracted information. Further, in the selected information extracting, information as to power sources and grounds and information as to components connected with the wirings relating to the power sources and the grounds may be extracted from the input information as to wirings and components of the analysis object.

In the electrostatic field analysis method, in the information inputting, the input information as to wirings and components of the analysis object may include attribute information of signal lines of the analysis object.

BRIEF DESCRIPTION OF THE DRAWINGS

A more complete appreciation of the present invention and many of the attended advantages thereof will be readily obtained as the present invention becomes better understood by reference to the following detailed description when considered in connection with the accompanying drawings, wherein.

DETAILED DESCRIPTION OF THE PREFERRED EMBODIMENTS

Figure 1:
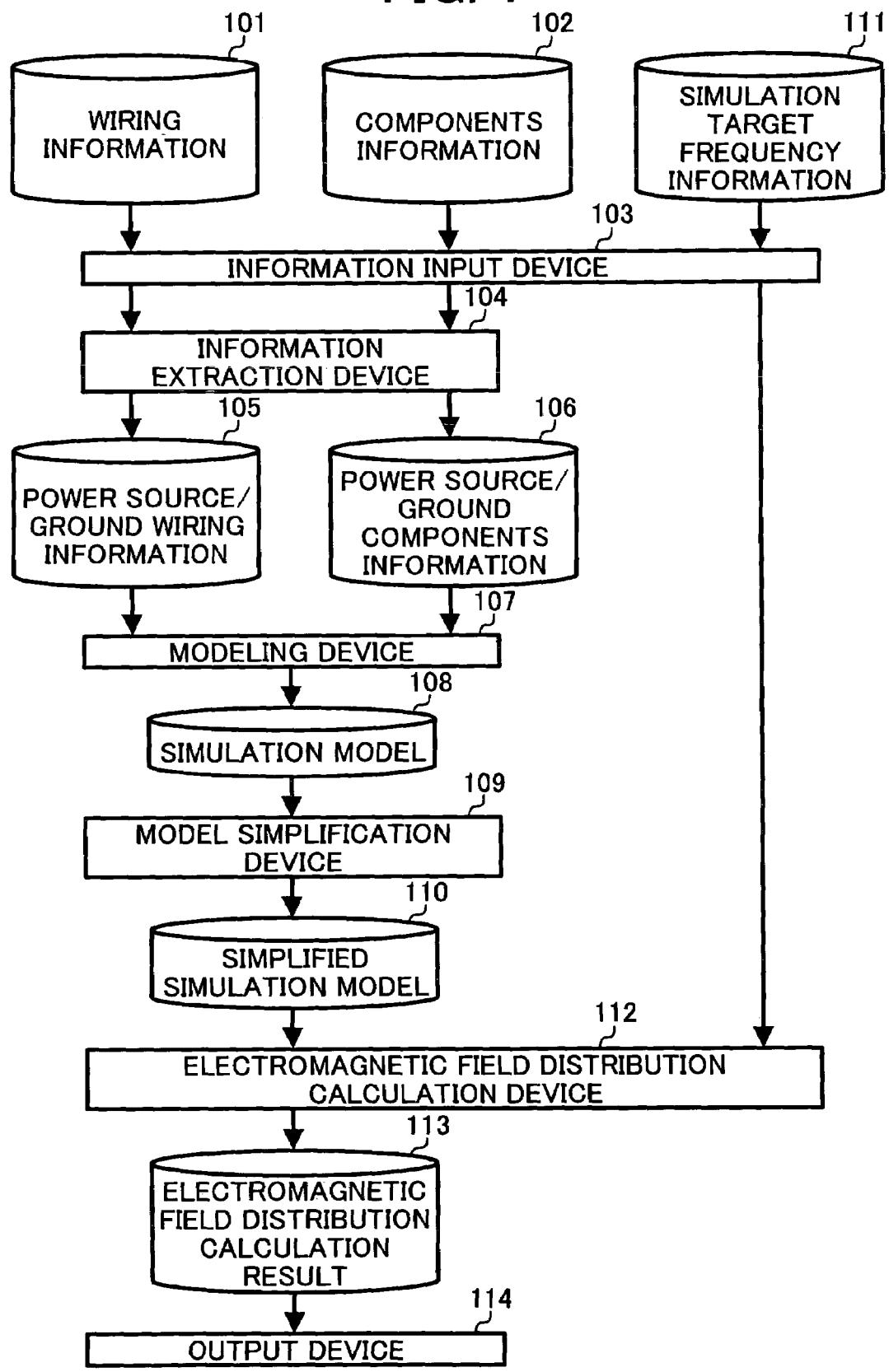
FIG. 1 is a diagram schematically illustrating an exemplary configuration of an electromagnetic field analysis apparatus according to an embodiment of the present invention.

Referring now to the drawings, wherein like reference numerals designate identical or corresponding parts throughout the several views, preferred embodiments of the present invention are described.

FIG. 1 is a diagram illustrating an exemplary configuration of an electromagnetic field analysis apparatus according to an embodiment of the present invention.

The electromagnetic field analysis apparatus includes an information input device 103, an information extraction device 104, a modeling device 107, a model simplification device 109, an electromagnetic field distribution calculation device 112, and an output device 114.

The information input device 103 inputs information as to an analysis object being the object for which the user wants to analyze the electromagnetic field. In this example, a wiring information 101 regarding wirings of the analysis object and a components information 102 regarding components of the analysis object are inputted. The information extraction device 103 extracts information as to wirings relating to power sources and grounds of the analysis object from the inputted wiring information 101, and generates a power source/ground wiring information 105 including the extracted information. The information extraction device 103 also extracts information as to components connected with the wirings relating to the power sources and the grounds of the analysis object from the inputted components information 102 based on the extracted information as to the wirings relating to the power sources and the grounds of the analysis object, and generates a power source/ground components information 106 including the extracted information.

The modeling device 107 generates a simulation model 108 of the analysis object based on the power source/ground wiring information 105 and the power source/ground components information 106. The model simplification device 109 simplifies the simulation model into a simplified simulation model 110 by dividing the analysis object according to the simulation model 108 into a plurality of cells and thinning out a plurality of elements included in each cell such that difference between a calculation result of a first electromagnetic field distribution of the analysis object according to the simplified simulation model and a measurement result of actual electromagnetic field distribution of the analysis object is minimal. The elements, which are thinned out, may be vias of the analysis object.

The electromagnetic field distribution calculation device 112 calculates a second, updated electromagnetic field distribution of the analysis object according to the simplified simulation model 110 for frequencies inputted via the information input device 103 using a simulation target frequency information 111, and generates an electromagnetic field distribution calculation result 113. The output device 114 outputs the electromagnetic field distribution calculation result 113.

The wiring information 101 includes information as to wirings of the analysis object such as wiring names, wiring pattern shapes, connections with other wirings and mounted components, etc. The components information 102 includes information as to the components (condensers, resistors, etc.) of the analysis object, such as address names (e.g., C205, R114, IC10, etc.), names of connected wirings, electric characteristics, etc. The information as to electric characteristics of each component includes a SPICE (simulation program with integrated circuit emphasis) model, which is used in a circuit analysis simulator SPICE. When a condenser is included in a printed circuit board, for example, the SPICE model including not only the information as to the capacity of the condenser but also the information as to parasitic components, such as resistors and inductors and other elements, is used. In this embodiment, the SPICE model in which a resister, a condenser, and an inductor connected in series, is used. Such parasitic components can be neglected when the observation frequency is relatively low. However, as the observation frequency is higher, the influence of parasitic components increases, for example when the high frequency up to about 1 GHz must be considered as in analyzing EMI noise, the parasitic components cannot be neglected. The simulation target frequency information 111 includes information as to specific target frequencies for performing simulation of electromagnetic field distribution.

Figure 2:
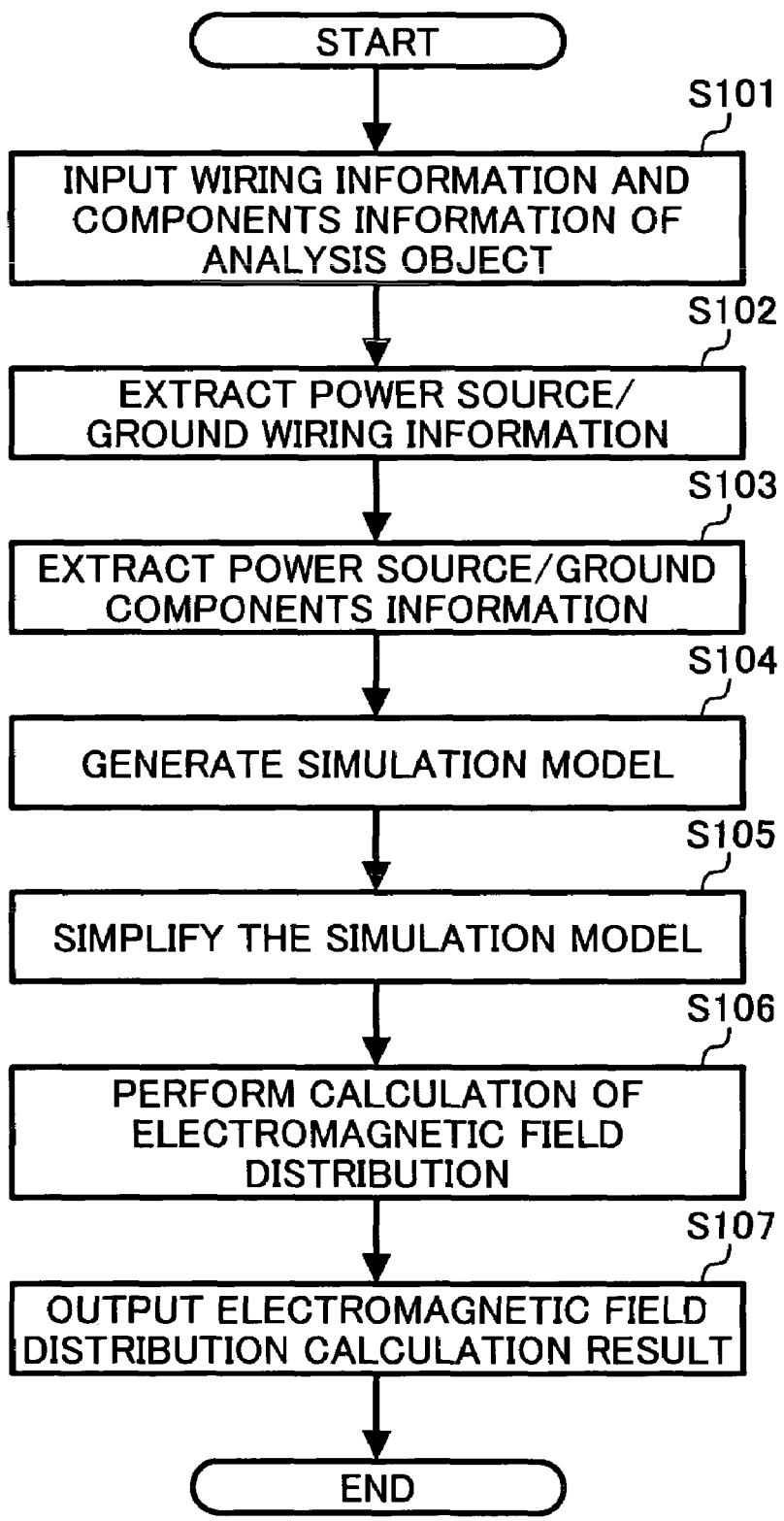
FIG. 2 is a flowchart illustrating a procedure of electromagnetic field analysis in the electromagnetic field analysis apparatus.

FIG. 2 is a flowchart illustrating a procedure of electromagnetic field analysis in the above-described electromagnetic field analysis apparatus.

Generally, in performing analysis of an electromagnetic field by computer simulation, a two-dimensional or three-dimensional simulation model of an analysis object is divided by meshes sufficiently fine into a plurality of cells for parallel processing, and calculation of a first electromagnetic field distribution is performed for each cell. In performing simulation of an electromagnetic field distribution of a printed circuit board, it is ideal to perform the simulation for all signal lines on the printed circuit board, while making the meshes fine and increasing the number of vias, as much as possible. As the number of vias is greater, the simulation result is closer to the actual electromagnetic field distribution. However, as the number of vias increases, the calculation time by a computer also increases, so that the memory usage and the calculation time of the computer may become unrealistically large. In particular, for devising a countermeasure against EMI noise radiation of a prototype product under development, it is unrealistic, in terms of the cost and time, to perform simulation of electromagnetic field distribution relative to all signal lines, while increasing the number of vias as much as possible.

Therefore, in this embodiment, in modeling an analysis object, vias other than the ones greatly contributing to EMI noise radiation are omitted from the information as to perform a simulation of an analysis object with reduced memory usage and decreased calculation time of a computer to calculate electromagnetic field distribution of the analysis object.

First, in step S101, the wiring information 101 regarding wirings of an analysis object and the components information 102 regarding components of the analysis object are input.

Then, in step S102, information regarding the wirings relating to power sources and grounds of the analysis object is extracted from the input wiring information 101, and the power source/ground wiring information 105 including the extracted information is generated. Thus, only the wiring information regarding the wirings relating to the power sources and the grounds, which greatly contribute to EMI noise radiation, is included in the power source/ground wiring information 105, so that vias other than those greatly contributing to EMI noise radiation are omitted in the power source/ground wiring information 105.

Here, the components information 102 of the analysis object includes the information for all components mounted on the analysis object. The wiring information regarding the wirings other than those relating to the power sources and the grounds of the analysis object having been deleted from the wiring information 101 of the analysis object, with regard to the components information 102 of the analysis object, only the information relating to those components connected with the wirings relating to the power sources and the grounds is necessary.

Accordingly, next in step S103, information regarding components connected with the wirings relating to the power sources and the grounds of the analysis object is extracted from the inputted components information 102 based on the information as to the wirings relating to the power sources and the grounds of the analysis object extracted in step S102, and the power source/ground components information 106 including the extracted information is generated.

Thereafter, in step S104, the simulation model 108 of the analysis object is generated based on the power source/ground wiring information 105 and the power source/ground components information 106. Thus, information related to the analysis object other the information relating to the power sources and the grounds of the analysis object is omitted in the simulation model 108.

Next, in step S105, the simulation model 108 is simplified and thereby the simplified simulation model 110 is generated. Specifically, the simulation model 108 is simplified by thinning out vias of the analysis object according to the simulation model such that only those vias greatly contributing to EMI noise radiation are left, as described later more in detail.

Thereafter, in step S106, calculation of a second, updated electromagnetic field distribution is performed according to the simplified simulation model for specified frequencies, and in step S107, a result of the calculation of electromagnetic field distribution is outputted.

It is ideal to perform the simulation linearly in the frequency range of 30 MHz-1 GHz, which is stipulated as the control range for electronic apparatuses in each country. However, specific frequencies for simulation may be determined in advance to decrease the calculation time. Generally, resonance is caused and thereby EMI noise is radiated at the frequency of an integral multiple of an output frequency of an oscillator used in a printed circuit board. Therefore, the frequencies for simulation may be arbitrarily set taking into consideration the oscillators used in the analysis object.

Figure 3:
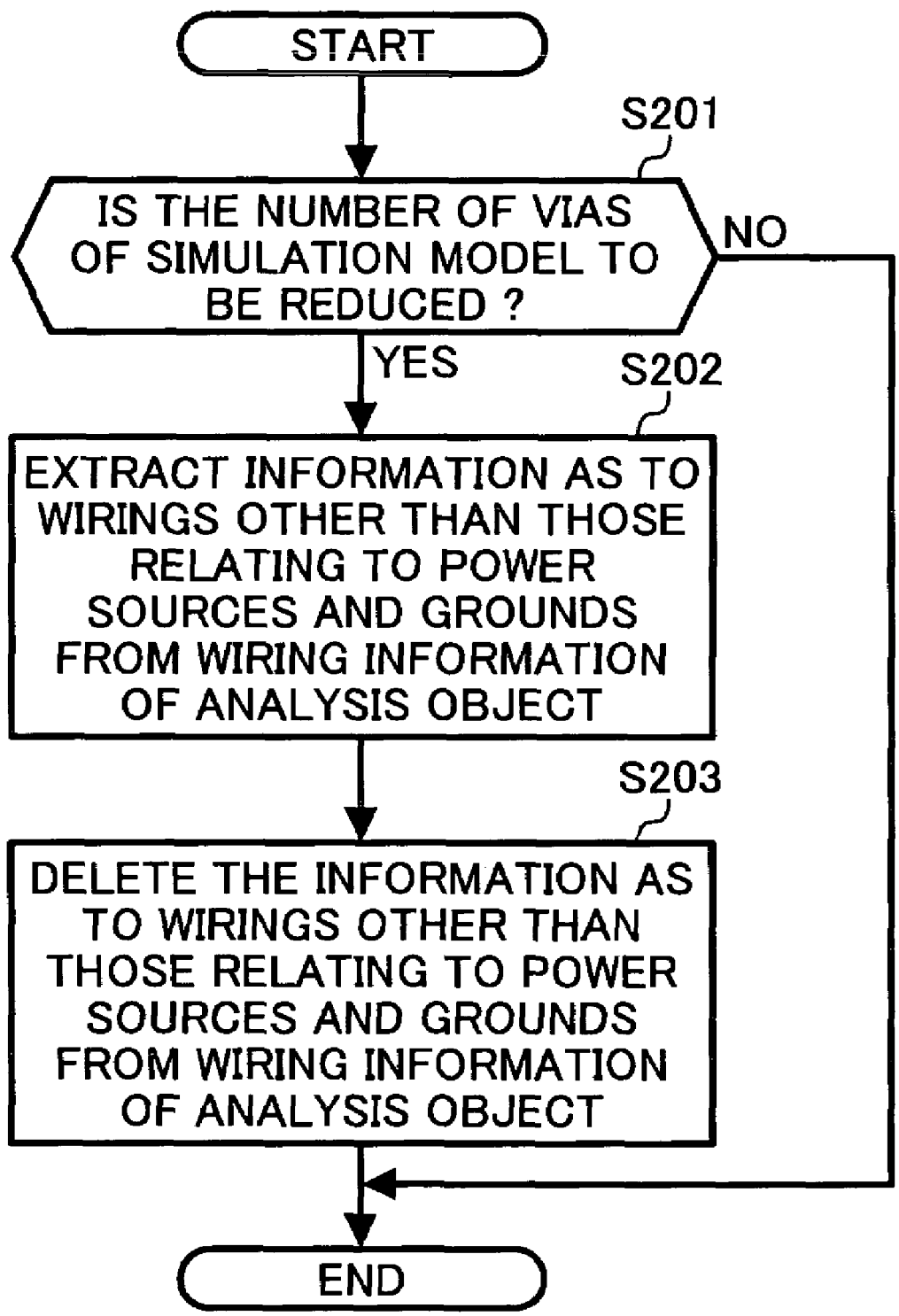
FIG. 3 is a flowchart of a procedure of extracting information as to wirings relating to power sources and grounds of an analysis object from wiring information of the analysis object.

FIG. 3 is a flowchart of a procedure of extracting the information regarding the wirings relating to the power sources and the grounds of the analysis object from the wiring information 101 of the analysis object.

In step S201, it is determined if the number of vias of a simulation model have to be reduced. When reducing the number of vias of the simulation model, in step S202, information (including signal names and connection information) as to wirings other than the information relating to the power sources and the grounds, such as signal transmitting wirings, is extracted from the wiring information 101 of the analysis object.

Thereafter, in step S203, the information as to wirings other than those relating to the power sources and the grounds is deleted from the wiring information 101 of the analysis object, and thereby the information as to the wirings relating to the power sources and the grounds of the analysis object is extracted from the wiring information 101 of the analysis object.

To specify wirings relating to power sources, when generating a circuit diagram of a printed circuit board, each signal name of wirings flowing a power source current may be denoted by a reference symbol ending with a letter "V" (e.g., 3.3V, A5V, M05V). Similarly, to specify wirings relating to grounds, when generating the circuit diagram of the printed circuit board, each signal name of wirings relating to grounds may be denoted by a reference symbol ending with letters "GND" (e.g., MO GND, AGND). Alternatively, attribute information of a power source, a ground, a signal, etc., may be included in the information as to each wiring, so that the wiring can be extracted using the corresponding attribute information.

Now, a process of thinning out vias of a printed circuit board, which is used in simplifying the simulation model 108, is described.

Before describing the process of thinning out vias of the present invention, a simple mechanical method of thinning out vias used in simplifying a simulation model of a printed circuit board is described referring to FIG. 4A, FIG. 4B, FIG. 5A, and FIG. 5B.

Figure 4A:
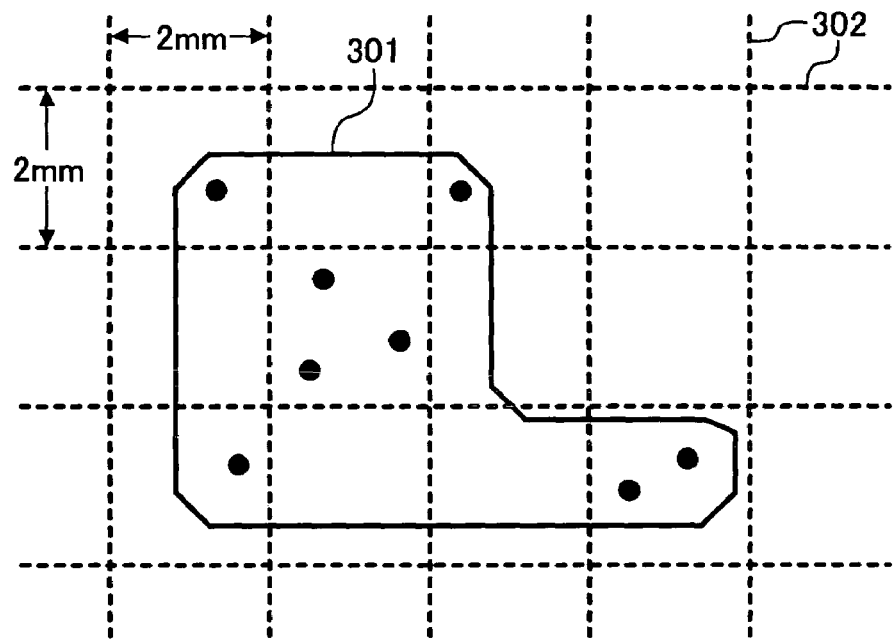
FIG. 4A is a diagram schematically illustrating a state of a printed circuit board divided by meshes into a plurality of cells, before performing thinning out vias in each cell.
Figure 4B:
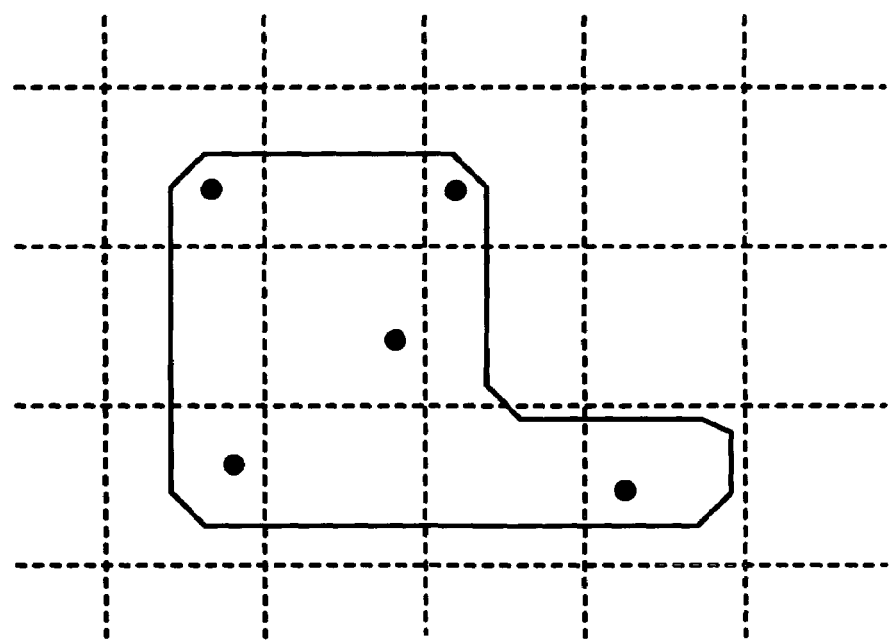
FIG. 4B is a diagram illustrating a state of the printed circuit board after performing thinning out vias in each cell by a simple mechanical thinning out method.

FIG. 4A and FIG. 4B are diagrams for explaining a non-limiting exemplary embodiment, wherein vias are thinned out by the simple mechanical thinning out method. In this case, a printed circuit board 301 is divided into a plurality of cells of 2 mm×2 mm by meshes 302, and when a plurality of vias are included in a cell, one of the plurality of vias in the cell is arbitrarily selected to be left and the others are deleted. FIG. 4A illustrates a state before thinning out is performed, and FIG. 4B illustrates a state after the thinning out has been performed.

This method is advantageous since the processing is relatively simple, so that the processing speed is relatively fast. In this method, however, because the current flow is not taken into consideration, it occurs that while a via through which a relatively large amount of current flows is deleted, a via through which only a relatively insignificant amount of current flows is left. In this case, the accuracy of electromagnetic field distribution simulation is greatly deteriorated.

Figure 5A:
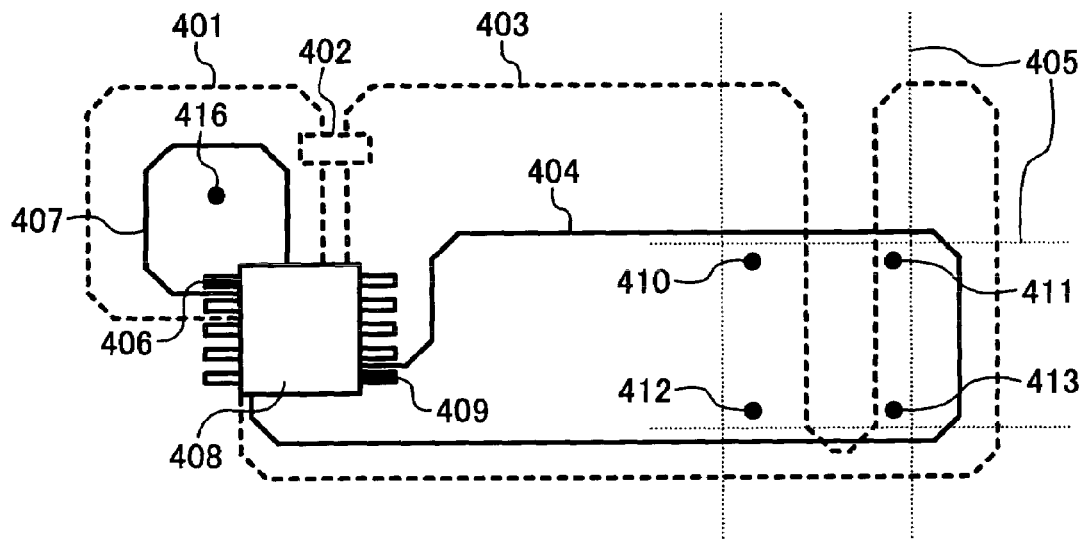
FIG. 5A is an enlarged diagram of apart of a printed circuit board for explaining a flow of current before performing thinning out vias in a cell.
Figure 5B:
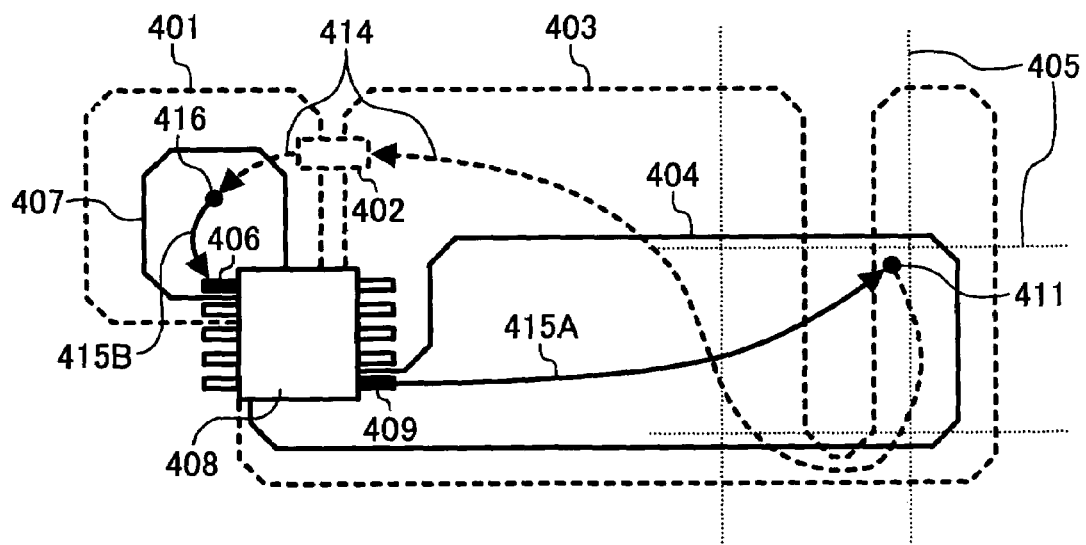
FIG. 5B is another enlarged diagram of the part of the printed circuit board for explaining a flow of current after performing thinning out vias in the cell by the simple mechanical thinning out method.

FIG. 5A and FIG. 5B are enlarged diagrams of a part of a printed circuit board for explaining a current flow when vias included in a cell are thinned out by the above-described simple mechanical method. In this example, four vias 410, 411, 412, and 413 included in a cell surrounded by meshes 405 as illustrated in FIG. 5A are thinned out by the simple mechanical method such that the via 411 is left in the cell as illustrated in FIG. 5B.

In FIG. 5A and FIG. 5B, reference numeral 408 denotes an IC (integrated circuit), reference numeral 406 denotes a power source terminal of the IC 408, and reference numeral 409 denotes a ground terminal of the IC 408. A solid line 404 indicates the outline of a ground pattern on the front surface (the component mounting surface) of the printed circuit board, and a dotted line 403 indicates the outline of a ground pattern on the rear surface (the solder surface) thereof. A solid line 407 indicates the outline of a power source pattern on the front surface, and a dotted line 401 indicates the outline of a power source pattern on the rear surface. Reference numeral 402 denotes a condenser mounted to the rear surface (the solder surface). A cut is made in the ground pattern 403 on the rear surface between the vias 410 and 412 at the left side in the cell and the vias 411 and 413 at the right side in the cell.

In an IC mounted on a printer circuit board, when an internal transistor of the IC is switched to be turned on and off, a relatively large pass current is generated between a power source terminal and a ground terminal of the IC, and a return current flows from the ground terminal of the IC, through the surface of the printed circuit board, to the power source terminal of the IC. Generally, as the loop area of the return current (the area surrounded by a locus of the flow of the return current) is larger, the radiation level of EMI noise is greater.

When the via 411 at the upper right side in the cell is left by arbitrary thinning out as illustrated in FIG. 5B, the return current flows from the ground terminal 409 of the IC 408 to the via 411 through the metal surface of the ground pattern 404 on the front surface as indicated by a solid line 415A in FIG. 5B, and then flows through the via 411 to the ground pattern 403 on the rear surface. The return current then flows, as indicated by a broken line 414, through the metal surface of the ground pattern 403 on the rear surface, while detouring the cut, and passes through the condenser 402 mounted on the rear surface, to the power source pattern 401 on the rear surface. The return current then flows to the power source pattern 407 on the front surface by way of a via 416 and flows through the metal surface of the power source pattern 407 on the front surface as indicated by a solid line 415B to be inputted to the power source terminal 406 of the IC 408.

On the other hand, the current flowing through an actual printed circuit board has the characteristic of flowing through a part of a pattern where impedance is the lowest. Here, among the current paths from the ground terminal 409 to the power source terminal 406 of the IC 408 through the vias 410, 411, 412, and 413 illustrated in FIG. 5A, the current path passing through the via 410 is the shortest, that is, the lowest in impedance, so that the current flowing through the via 410 constitutes the major part of return currents flowing in the printed circuit board. Meanwhile, the return current path passing through the via 411 illustrated in FIG. 5B is the one through which the least amount of current flows among the return current paths from the ground terminal 409 to the power source terminal 406 of the IC 408 through the vias 410, 411, 412, and 413, because the return current flowing through the rear (solder) surface passes a thinner part (i.e., the cut part) of the ground pattern 403 on the solder surface where the impedance is relatively high, comparing with the other parts.

Thus, if the via 411 is left in the thinning out process, the first calculated electromagnetic field distribution greatly differs from the actual electromagnetic field distribution, so that the accuracy of a second electromagnetic field distribution simulation is deteriorated. Furthermore, because the potential difference is caused and thereby noise is caused when the return current flowing through the rear (solder) surface passes the thinner part of the ground pattern on the solder surface where the impedance is relatively high, the calculated electromagnetic field distribution differs more from the actual electromagnetic field distribution, so that the accuracy of electromagnetic field distribution simulation is further deteriorated.

Figure 6:
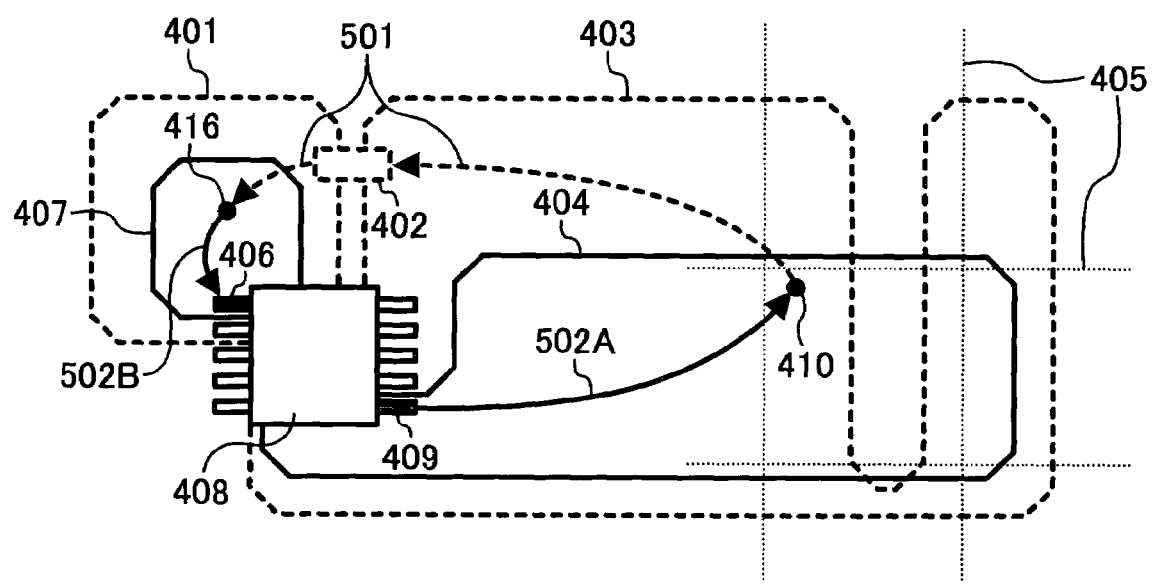
FIG. 6 is a diagram for explaining a flow of current when thinning out vias in the cell has been performed by an optimized thinning out method according to the embodiment of the present invention.

FIG. 6 is a diagram for explaining a current flow in the printed circuit board when thinning out of vias has been optimized according to the embodiment of the present invention. In this example, among the four vias 410, 411, 412, and 413 included in the cell, the via 410 is left, through which the major part of return currents in the printed circuit board flows as described above. When the via 410 is left, the return current flows from the ground terminal 409 to the via 410 through the ground pattern 404 on the front surface as indicated by a solid line 502A, and then flows through the via 410 to the ground pattern 403 on the rear surface. The return current then flows, as indicated by a broken line 501, through the metal surface of the ground pattern 403, the condenser 402, and the ground pattern 401 on the rear surface, to the via 416. The return current then flows through the via 416 to the ground pattern 407 on the front surface to be inputted to the power source terminal 406 as indicated by a solid line 502B.

Thus, depending upon the method of thinning out vias, the flow of a return current greatly changes, and unless thinning out of vias is optimized, it occurs that the calculated electromagnetic filed distribution greatly differs from the actual electromagnetic field distribution and thereby the accuracy of electromagnetic field distribution simulation is deteriorated.

In reality, a very small current flows through a nonconductive or highly-resistive part. However, in this embodiment, it is premised that the current does not flow through the nonconductive or highly-resistive parts.

Figure 7:
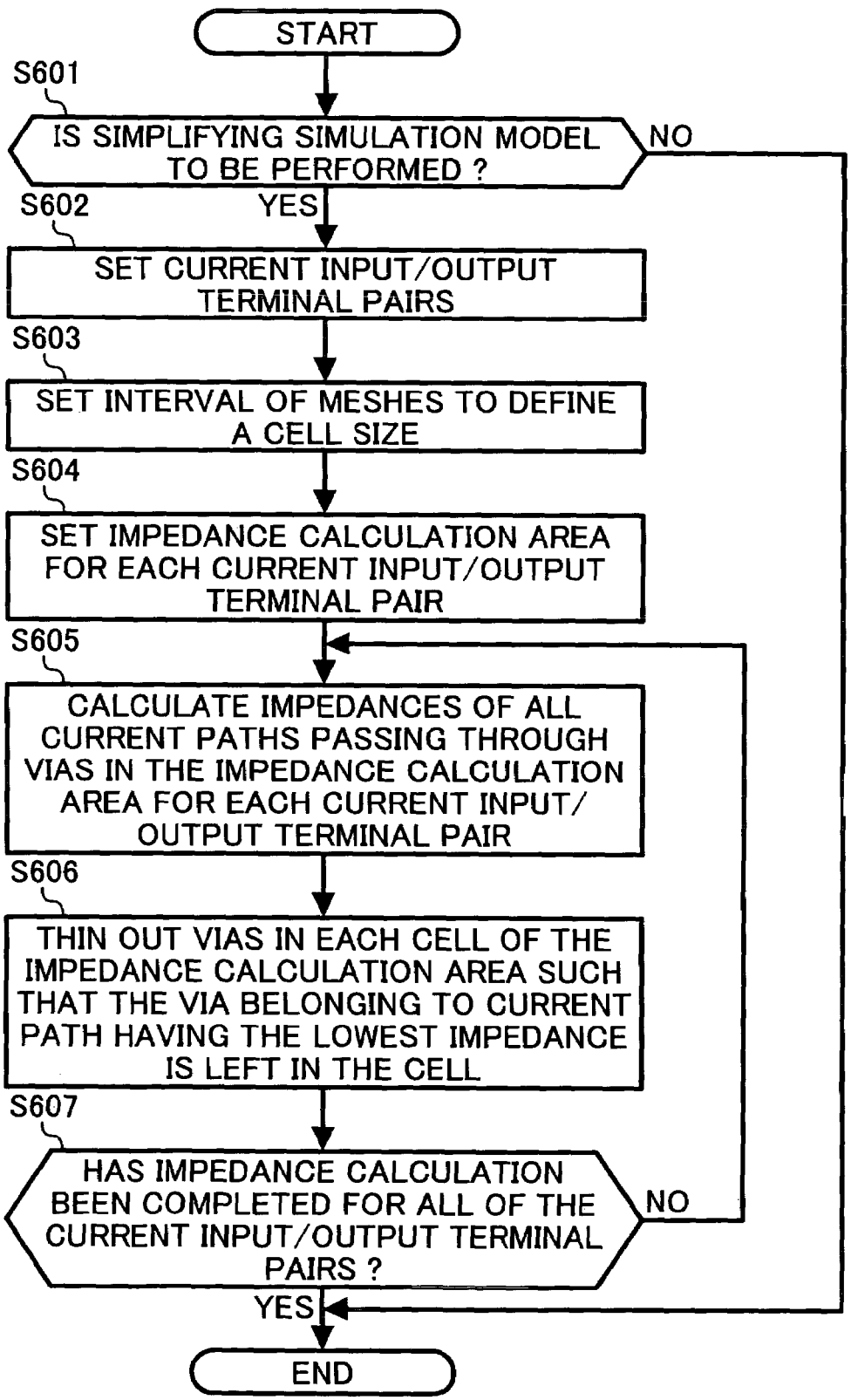
FIG. 7 is a flowchart of a procedure of simplifying a simulation model.
Figure 8:
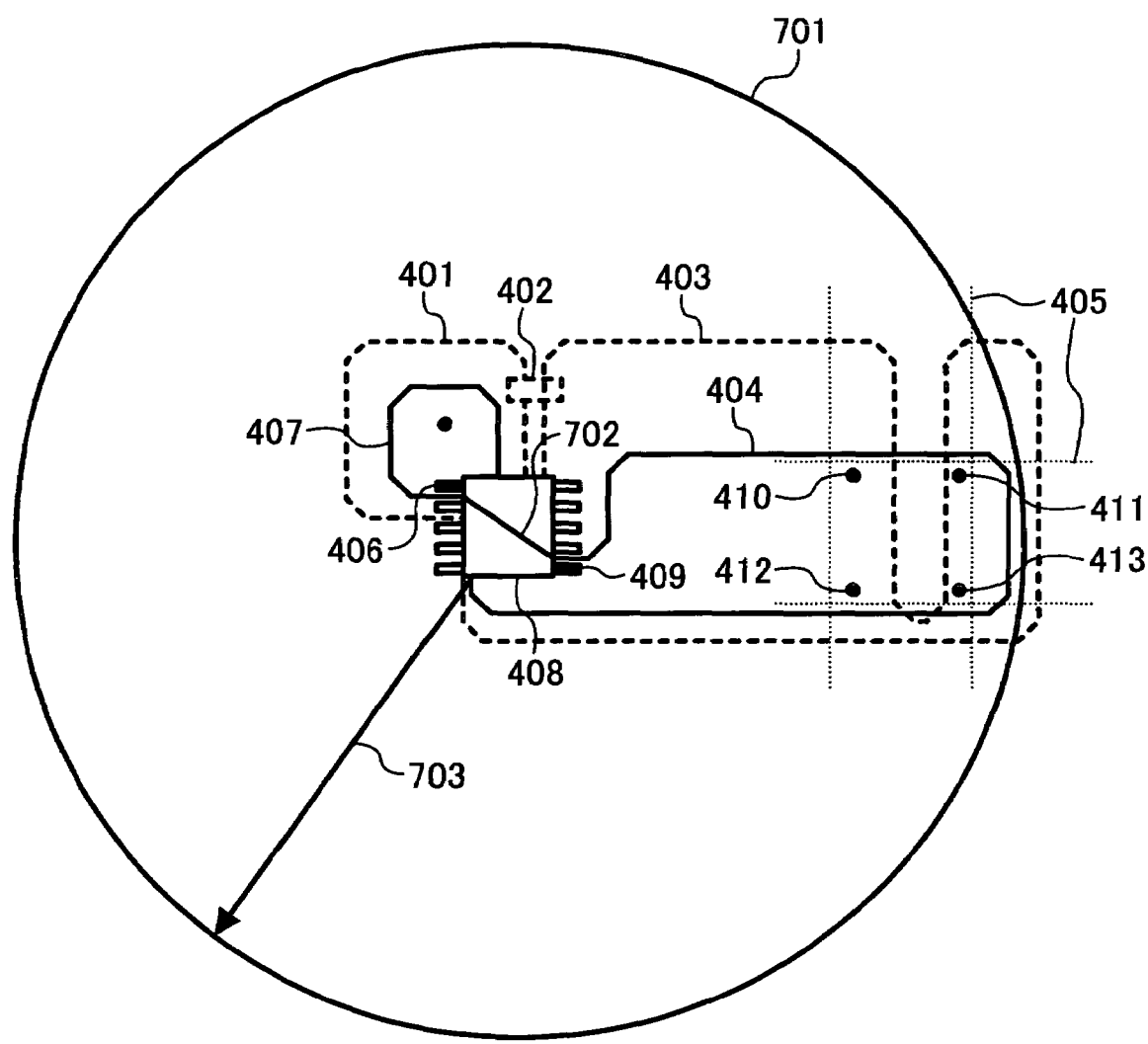
FIG. 8 is a diagram illustrating examples of meshes and an impedance calculation area set in performing simplifying the simulation model.

FIG. 7 is a flowchart of a procedure of simplifying the simulation model 108 of the analysis object. FIG. 8 is a diagram illustrating examples of meshes and an impedance calculation area set in simplifying the simulation model 108. The printed circuit board used in describing the process of thinning out vias above is used as the analysis object in FIG. 8.

Referring to FIG. 7, first, it is determined if simplifying the simulation model 108 is to be performed (S601). When simplifying the simulation model 108 is to be performed, the procedure proceeds to step S602, and when simplifying the simulation model 108 is not to be performed, the procedure ends. In step S602, the pairs of a current input (power source) terminal and a current output (ground) terminal of the analysis object are set according to the simulation model 108.

In FIG. 8, as described above, a switching current inputted from the power source terminal 406 flows to the ground terminal 409 through the internal circuit of the IC 408, and the return current of the switching current returns from the ground terminal 409 to the power source terminal 406 flowing through the current path where the impedance is the least in the printed circuit board. The information that the return current of the switching current of the IC 408 flows from the ground terminal 409 to the power source terminal 406 is stored in advance in the components information 102 as the information regarding the pair of the power source terminal 406 and the ground terminal 409. When a plurality of power source terminals and ground terminals are included, the information as to each pair of a power source terminal and a ground terminal is stored in the components information 102.

Then, in step S603, the interval of meshes 405 is arbitrarily set. The interval of meshes 405 defines a cell size, which is the unit area for thinning out vias. By setting the interval of meshes 405, the cell size is set. In FIG. 8, the vias 410, 411, 412, and 413 are included in a cell surrounded by the meshes 405. In this example, thinning out of vias is performed such that one via is left in each cell.

The cell size, i.e., the interval of the meshes 405, needs to be set to an optimum value according to the size of a circuit of a printed circuit board and the processing power of a computer. It is needless to say that by narrowing the interval of the meshes 405, the accuracy of electromagnetic field distribution simulation is increased, however, if the interval of the meshes 405 is narrowed too excessively, the calculation time for the simulation will increase drastically, and even overflowing might be caused.

In this embodiment, the interval of the meshes 405 is set constant, however, the interval of the meshes 405 may be set finer in a part where a relatively large number of vias are located and coarser in a part where a relatively small number of vias are located. Thereby, the accuracy of electromagnetic field distribution simulation can be enhanced without increasing the calculation load for the computer too extensively.

After setting the interval of the meshes 405, in step S604, an impedance calculation area is set for each pair of a current input (power source) terminal and a current output (ground) terminal set in step S602. The area enclosed by a circle drawn with an arbitrary radius around the mid point of the line connecting the current input (power source) terminal and the current output (ground) terminal via the shortest route is defined as the impedance calculation area. In FIG. 8, the area enclosed by a circle 701 drawn with an arbitrary radius 703 around the mid point of a line 702 connecting the power source terminal 406 and the ground terminal 409 of the IC 408 via the shortest route is defined as the impedance calculation area for the pair of the power source terminal 406 and the ground terminal 409.

By making the impedance calculation area 701 larger, the accuracy of electromagnetic field distribution simulation is increased, however, if the impedance calculation area 701 is made excessively large, the calculation time for the simulation will increase significantly, and overflowing might be caused. Therefore, the impedance calculation area 701 needs to be determined optimally according to the circuit size of the printed circuit board and the processing power of the computer as in the size of the cell.

In step S605, the impedances of all current paths passing through vias in the impedance calculation area 701 are calculated for each pair of a current input terminal and a current output terminal. In this example, the impedances of all current paths passing through the vias 410, 411, 412, and 413 in the impedance calculation area 701 are calculated.

Then, in step S606, among vias included in each cell, the one belonging to the current path having the lowest impedance among current paths passing through the vias in the cell is left. In this example, among the vias 410, 411, 412, and 413 included in the cell surrounded by the meshes 405, the via 410 belongs to the current path having the lowest impedance among the current paths passing through the vias 410, 411, 412 and 413 in the cell, so that the via 410 is left and the rest is deleted.

Figure 9:
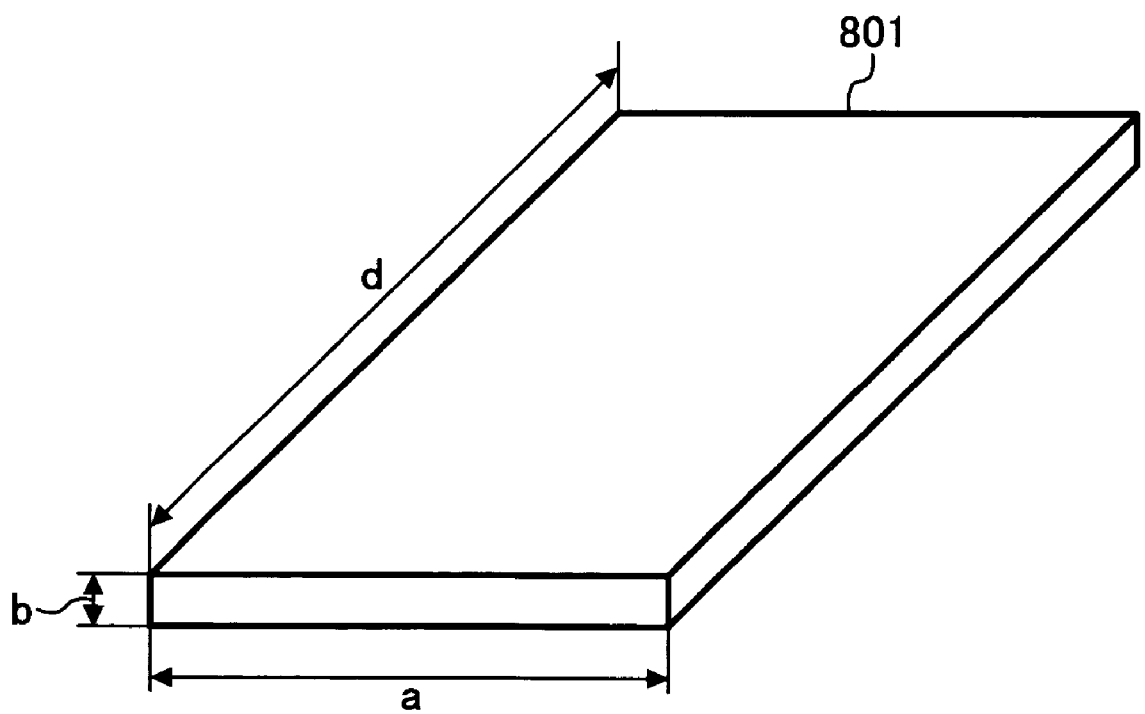
FIG. 9 is a diagram illustrating a model of a signal line.

Here, in a printed circuit board, the impedance of a current path is greater as the self-inductance of a signal line is greater, and the self-inductance "L" of a signal line 801 having the width "a", the thickness "b", and the length "d", as illustrated in FIG. 9, for example, can be obtained by the following formula: $L=2 d\{\ln(0.447 d/R)+0.5+R/d\}$, wherein $R=0.2235(a+b)$. From the above formula, the self-inductance "L" of a signal line is greater as the length "d" of the signal line is longer, so that the impedance of a current path is greater as the current path is longer. Accordingly, instead of calculating the impedances of all current paths passing through vias in the impedance calculation area 701 for each pairs of current input terminals and a current output terminals, by calculating the distances of all current paths passing through the vias in the impedance calculation area 701, alternatively, the via belonging to the current path having the lowest impedance among current paths passing through vias in each cell can be determined by employing the above formula. In this case, the distances of all current paths from a ground terminal, through vias, to a power source terminal are calculated based on routes passing only the conductive part on the printed circuit board.

In calculating the impedance of each current path, when an extra computer memory and an extra calculation time are available, the accuracy of simulation can be increased by taking into consideration the change which may be caused in the impedance by the difference in the pattern width and the influence caused by the current passing through mounted components.

When a plurality of vias in a cell is included in the impedance calculation area 701 of each of a plurality of ICs of a printed circuit board, the above-described impedance calculation is performed for each IC and the via belong to the current path having the lowest impedance is left for each IC, so that in this case, a plurality of vias may be left in the cell.

When it has been confirmed that calculation of the impedances of all current paths passing through vias in the impedance calculation area 701 has been completed for all of the pairs of a current input terminal and a current output terminal (step 607), the procedure ends, and thereby the simplified simulation model is generated.

The mechanism and processes set forth in the present description may be implemented as a computer program according to the teachings in the present specification, as will be appreciated to those skilled in the relevant arts. Appropriate software coding can be readily prepared by skilled programmers based on the teachings of the present disclosure, as will be also apparent to those skilled in the relevant arts.

The present invention thus includes a computer program product which may be hosted on a storage medium and includes instructions which when executed by a computer perform the processes set forth in the present description. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above-teachings. It is therefore to be understood that within the scope of the claims, the present invention can be practiced otherwise than as specifically described herein.

What is claimed is:

1. An electromagnetic field analysis apparatus, comprising:
   an information input device configured to input information regarding wirings and components of an analysis object;
   a modeling device configured to generate a simulation model of the analysis object based on the input information regarding the wirings and the components of the analysis object;
   a model simplification device configured to simplify the simulation model into a simplified simulation model by dividing the analysis object according to the simulation model into a plurality of cells and thinning out, when a plurality of elements are included in a cell, the plurality of elements included in the cell;
   an electromagnetic field distribution calculation device configured to calculate an updated electromagnetic field distribution of the analysis object according to the simplified simulation model; and
   an output device configured to output a calculation result of the updated electromagnetic field distribution of the analysis object according to the simplified simulation model, wherein:
the electromagnetic field analysis apparatus includes hardware,
the elements, which are thinned out by the model simplification device, are vias of the analysis object, and
the model simplification device is configured to set pairs of a current input terminal and a current output terminal of each component of the analysis object according to the simulation model, is configured to set an interval of meshes defining a size of each cell, is configured to set an impedance calculation area for each pair of a current input terminal and a current output terminal, is configured to calculate impedances of all current paths passing through vias in each impedance calculation area, and is configured to thin out vias included in each cell in the impedance calculation area such that a via belonging to a current path having the lowest impedance among current paths passing through the vias in the cell remains.

2. The electromagnetic field analysis apparatus according to claim 1, wherein the model simplification device is further configured to thin out the plurality of elements included in the cell based on an electric current.

3. The electromagnetic field analysis apparatus according to claim 1, further comprising an information extraction device configured to extract selected information from the inputted information regarding the wirings and the components of the analysis object, and wherein the modeling device is configured to generate the simulation model of the analysis object based on the extracted information.

4. The electromagnetic field analysis apparatus according to claim 3, wherein the information extraction device is configured to extract from the input information regarding the wirings and the components of the analysis object information as to wirings relating to power sources and grounds of the analysis object and information regarding the components connected with the wirings relating to the power sources and the grounds.

5. The electromagnetic field analysis apparatus according to claim 1, wherein the information regarding the wirings and the components of the analysis object input to the information input device includes attribute information of signal lines of the analysis object.

6. An electromagnetic field analysis apparatus, comprising:
an information input device configured to input information as to wirings and components of an analysis object;
a modeling device configured to generate a simulation model of the analysis object based on the inputted information as to wirings and components of the analysis object;
a model simplification device configured to simplify the simulation model into a simplified simulation model by dividing the analysis object according to the simulation model into a plurality of cells and thinning out, when a plurality of elements are included in a cell, the plurality of elements included in the cell;
an electromagnetic field distribution calculation device configured to calculate electromagnetic field distribution of the analysis object according to the simplified simulation model; and
an output device configured to output a calculation result of the electromagnetic field distribution of the analysis object according to the simplified simulation model,
wherein the electromagnetic field analysis apparatus includes hardware,
wherein the elements, which are thinned out by the model simplification device, are vias of the analysis object, and wherein the model simplification device is configured to set pairs of a current input terminal and a current output terminal of each component of the analysis object according to the simulation model, is configured to set an interval of meshes defining a size of each cell, is configured to set an impedance calculation area for each pair of a current input terminal and a current output terminal, is configured to calculate lengths of current paths passing through vias in each impedance calculation area, and is configured to thin out vias included in each cell in the impedance calculation area such that a via belonging to a shortest current path among current paths passing through the vias in the cell remains.

7. An electromagnetic field analysis method, comprising:
inputting, using an information input device, information regarding the wirings and the components of an analysis object;
generating, using a modeling device, a simulation model of the analysis object based on the input information regarding the wirings and the components of the analysis object;
simplifying, using a model simplification device, the simulation model into a simplified simulation model by dividing the analysis object according to the simulation model into a plurality of cells and thinning out, when a plurality of elements are included in a cell, the plurality of elements included in the cell;
calculating, using an electromagnetic field distribution calculation device, an updated electromagnetic field distribution of the analysis object according to the simplified simulation model; and
outputting, using an outputting device, a calculation result of the updated electromagnetic field distribution of the analysis object according to the simplified simulation model,
wherein the information input device, the modeling device, the model simplification device, the electromagnetic field distribution calculation device, and output device include hardware,
wherein in the simulation model simplifying, the elements, which are thinned out, are vias of the analysis object, and
wherein in the simulation model simplifying, pairs of a current input terminal and a current output terminal of each component of the analysis object according to the simulation model are set, an interval of meshes defining a size of each cell is set, an impedance calculation area is set for each pair of a current input terminal and a current output terminal, impedances of all current paths passing through vias in each impedance calculation area are calculated, and vias included in each cell in the impedance calculation area are thinned out such that a via belonging to a current path having the lowest impedance among current paths passing through the vias in the cell remains.

8. The electromagnetic field analysis method according to claim 7, wherein in the simplifying, the plurality of elements included in the cell are thinned out based on an electric current.

9. The electromagnetic field analysis method according to claim 7, further including:
extracting selected information from the input information regarding the wirings and the components of the analysis object, and wherein in the generating, the simulation model of the analysis object is generated based on the extracted information.

10. The electromagnetic field analysis method according to claim 9, wherein in the extracting, information regarding power sources and grounds and information regarding components connected with the wirings relating to the power sources and the grounds are extracted from the input information regarding the wirings and components of the analysis object.

11. The electrostatic field analysis method according to claim 7, wherein in the inputting, the input information regarding the wirings and the components of the analysis object includes attribute information of signal lines of the analysis object.

12. An electromagnetic field analysis method, comprising:
inputting, using an information input device, information as to wirings and components of an analysis object;
generating, using a modeling device, a simulation model of the analysis object based on the inputted information as to wirings and components of the analysis object;
simplifying, using a model simplification device, the simulation model into a simplified simulation model by dividing the analysis object according to the simulation model into a plurality of cells and thinning out, when a plurality of elements are included in a cell, the plurality of elements included in the cell;
calculating, using an electromagnetic field distribution calculation device, an electromagnetic field distribution of the analysis object according to the simplified simulation model; and
outputting, using an outputting device, a calculation result of the electromagnetic field distribution of the analysis object according to the simplified simulation model,
wherein the information input device, the modeling device, the model simplification device, the electromagnetic field distribution calculation device, and output device include hardware,
wherein in the simulation model simplifying, the elements, which are thinned out, are vias of the analysis object, and
wherein in the simplifying, pairs of a current input terminal and a current output terminal of each component of the analysis object according to the simulation model are set, an interval of meshes defining a size of each cell is set, an impedance calculation area is set for each pair of a current input terminal and a current output terminal, lengths of all current paths passing through vias in each impedance calculation area are calculated, and vias included in each cell in the impedance calculation area are thinned out such that a via belonging to a shortest current path among current paths passing through the vias in the cell remains.

13. A computer readable medium which is a tangible computer memory storing computer program instructions which when executed by a computer performs an electromagnetic field analysis operation comprising:
inputting, using an information input device, information regarding wirings and components of an analysis object;
generating, using a modeling device, a simulation model of the analysis object based on the input information regarding the wirings and the components of the analysis object;
simplifying, using a model simplification device, the simulation model into a simplified simulation model by dividing the analysis object according to the simulation model into a plurality of cells and thinning out, when a plurality of elements are included in a cell, the plurality of elements included in the cell;
calculating, using a model simplification device, an updated electromagnetic field distribution of the analysis object according to the simplified simulation model; and
outputting, using an outputting device, a calculation result of the updated electromagnetic field distribution of the analysis object according to the simplified simulation model,
wherein in the simulation model simplifying step, the elements, which are thinned out, are vias of the analysis object, and
wherein in the simulation model simplifying step, pairs of a current input terminal and a current output terminal of each component of the analysis object according to the simulation model are set, an interval of meshes defining a size of each cell is set, an impedance calculation area is set for each pair of a current input terminal and a current output terminal, impedances of all current paths passing through vias in each impedance calculation area are calculated, and vias included in each cell in the impedance calculation area are thinned out such that a via belonging to a current path having the lowest impedance among current paths passing through the vias in the cell remains.

14. The computer readable medium according to claim 13, wherein in the simplifying, the plurality of elements included in the cell are thinned based on an electric current.

15. The computer readable medium according to claim 13, the electromagnetic field analysis operation further comprising:
extracting selected information from the input information regarding the wirings and the components of the analysis object, and
wherein in the generating, the simulation model of the analysis object is generated based on the extracted information.

16. The computer readable medium according to claim 15, wherein in the extracting, information regarding power sources and grounds and information regarding components connected with the wirings relating to the power sources and the grounds are extracted from the input information regarding the wirings and the components of the analysis object.

17. The computer readable medium according to claim 13, wherein in the inputting, the input information regarding the wirings and the components of the analysis object includes attribute information of signal lines of the analysis object.

18. A computer readable medium which is a tangible computer memory storing computer program instructions which when executed by a computer performs an electromagnetic field analysis operation comprising the steps of:
inputting, using an information input device, information as to wirings and components of an analysis object;
generating, using a modeling device, a simulation model of the analysis object based on the inputted information as to wirings and components of the analysis object;
simplifying, using a model simplification device, the simulation model into a simplified simulation model by dividing the analysis object according to the simulation model into a plurality of cells and thinning out, when a plurality of elements are included in a cell, the plurality of elements included in the cell;
calculating, using a model simplification device, an electromagnetic field distribution of the analysis object according to the simplified simulation model; and
outputting, using an outputting device, a calculation result of the electromagnetic field distribution of the analysis object according to the simplified simulation model,
wherein in the simulation model simplifying step, the elements, which are thinned out, are vias of the analysis object, and wherein in the simplifying step, pairs of a current input terminal and a current output terminal of each component of the analysis object according to the simulation model are set, an interval of meshes defining a size of each cell is set, an impedance calculation area is set for each pair of a current input terminal and a current output terminal, lengths of all current paths passing through vias in each impedance calculation area are calculated, and vias included in each cell in the impedance calculation area are thinned out such that a via belonging to a shortest current path among current paths passing through the vias in the cell remains.

19. A computer program product which is a tangible computer memory including computer program instructions directly loadable into an internal memory of a computer, the computer program instructions, when executed by the computer, performing an electromagnetic field analysis operation comprising:

inputting, using an information input device, information regarding wirings and components of an analysis object;

generating, using a modeling device, a simulation model of the analysis object based on the input information regarding the wirings and the components of the analysis object;

simplifying, using a model simplification device, the simulation model into a simplified simulation model by dividing the analysis object according to the simulation model into a plurality of cells and thinning out, when a plurality of elements are included in a cell, the plurality of elements included in the cell;

calculating, using a model simplification device, an updated electromagnetic field distribution of the analysis object according to the simplified simulation model; and outputting, using an outputting device, a calculation result of the updated electromagnetic field distribution of the analysis object according to the simplified simulation model, wherein in the simulation model simplifying step, the elements, which are thinned out, are vias of the analysis object, and wherein in the simulation model simplifying step, pairs of a current input terminal and a current output terminal of each component of the analysis object according to the simulation model are set, an interval of meshes defining a size of each cell is set, an impedance calculation area is set for each pair of a current input terminal and a current output terminal, impedances of all current paths passing through vias in each impedance calculation area are calculated, and vias included in each cell in the impedance calculation area are thinned out such that a via belonging to a current path having the lowest impedance among current paths passing through the vias in the cell remains.

20. The computer program product according to claim 19, wherein in the simplifying, the plurality of elements included in the cell are thinned out based on an electric current.

21. The computer program product according to claim 19, the electromagnetic field analysis operation further comprising:

extracting selected information from the input information regarding the wirings and the components of the analysis object, and wherein in the simulation model generating step, the simulation model of the analysis object is generated based on the extracted information.

22. The computer program product according to claim 21, wherein in the extracting, information regarding power sources and grounds and information regarding components connected with the wirings relating to the power sources and the grounds are extracted from the input information regarding the wirings and the components of the analysis object.

23. The computer program product medium according to claim 19, wherein in inputting, the input information regarding the wirings and the components of the analysis object includes attribute information of signal lines of the analysis object.

24. A computer program product which is a tangible computer memory including computer program instructions directly loadable into an internal memory of a computer, the computer program instructions, when executed by the computer, performing an electromagnetic field analysis operation comprising the steps of:

inputting, using an information input device, information as to wirings and components of an analysis object;

generating, using a modeling device, a simulation model of the analysis object based on the inputted information as to wirings and components of the analysis object;

simplifying, using a model simplification device, the simulation model into a simplified simulation model by dividing the analysis object according to the simulation model into a plurality of cells and thinning out, when a plurality of elements are included in a cell, the plurality of elements included in the cell;

calculating, using a model simplification device, an electromagnetic field distribution of the analysis object according to the simplified simulation model; and outputting, using an outputting device, a calculation result of the electromagnetic field distribution of the analysis object according to the simplified simulation model, wherein in the simulation model simplifying step, the elements, which are thinned out, are vias of the analysis object, and wherein in the simplifying, pairs of a current input terminal and a current output terminal of each component of the analysis object according to the simulation model are set, an interval of meshes defining a size of each cell is set, an impedance calculation area is set for each pair of a current input terminal and a current output terminal, lengths of all current paths passing through vias in each impedance calculation area are calculated, and vias included in each cell in the impedance calculation area are thinned out such that a via belonging to a shortest current path among current paths passing through the vias in the cell remains.

* * * * *